United States Patent
Iinuma et al.

(10) Patent No.: US 7,264,345 B2
(45) Date of Patent: Sep. 4, 2007

(54) LIQUID COMPOSITION FOR INK JET, INK SET FOR INK JET, AND RECORDING METHOD AND RECORDING APPARATUS USING THE SAME

(75) Inventors: Taiga Iinuma, Ebina (JP); Ken Hashimoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 256 days.

(21) Appl. No.: 10/862,393

(22) Filed: Jun. 8, 2004

(65) Prior Publication Data

US 2004/0257419 A1    Dec. 23, 2004

(30) Foreign Application Priority Data

Jun. 9, 2003    (JP) ............................. 2003-163456

(51) Int. Cl.
    *G01D 11/00*    (2006.01)
(52) U.S. Cl. ..................................... 347/100
(58) Field of Classification Search ................. 347/100
    See application file for complete search history.

(56) References Cited

U.S. PATENT DOCUMENTS

| | | |
|---|---|---|
| 5,085,698 A | 2/1992 | Ma et al. |
| 5,221,334 A | 6/1993 | Ma et al. |
| 6,398,356 B1 * | 6/2002 | Fukuda et al. .............. 347/100 |
| 2002/0063765 A1 * | 5/2002 | Hakamada et al. ......... 347/100 |
| 2003/0068512 A1 * | 4/2003 | Takahashi et al. .......... 428/480 |
| 2005/0007432 A1 * | 1/2005 | Kanaya et al. .............. 347/100 |

FOREIGN PATENT DOCUMENTS

| JP | A 55-065269 | 5/1980 |
|---|---|---|
| JP | A 56-147871 | 11/1981 |
| JP | 01254778 A * | 10/1989 |
| JP | A 5-186725 | 7/1993 |
| JP | A 7-224241 | 8/1995 |
| JP | A 8-218018 | 8/1996 |
| JP | A 9-286941 | 11/1997 |
| JP | A 2000-119574 | 4/2000 |
| JP | 2000186243 A * | 7/2000 |

* cited by examiner

*Primary Examiner*—Manish S. Shah
*Assistant Examiner*—Laura E. Martin
(74) *Attorney, Agent, or Firm*—Oliff & Berridge, PLC

(57) ABSTRACT

A liquid composition containing at least water, a photopolymerization initiator, a water-soluble organic solvent and a polymerizable compound that can cause a polymerization reaction due to the photo polymerizing initiator, wherein the polymerizable compound is contained two or more kinds, the glass transition temperature (Tg) of at least one kind of the polymerizable compound being 50° C. or more, and the glass transition temperature (Tg) of at least one kind thereof being 10° C. or less, an ink set for ink jet, and a recording method and a recording apparatus using the same.

14 Claims, No Drawings

LIQUID COMPOSITION FOR INK JET, INK SET FOR INK JET, AND RECORDING METHOD AND RECORDING APPARATUS USING THE SAME

CROSS-REFERENCE TO RELATED APPLICATIONS

This application claims priority under 35 USC 119 from Japanese patent document, No. 2003-163456, the disclosure of which is incorporated by reference herein.

BACKGROUND OF THE PRESENT INVENTION

1. Field of the Present Invention

The present invention relates to a liquid composition for ink jet, an ink set for an ink jet, and an ink jet recording apparatus and a recording method therefor.

2. Description of the Related Art

An ink jet printer is an apparatus that discharges liquid or molten solid ink out of a nozzle, a slit, or a porous film onto a sheet of paper, a piece of cloth, or a film to record thereon. It is known to have such advantages as compactness, moderate price, and quietness. A piezo ink jet method using a piezoelectric element and a thermal ink jet method in which recording is curried out by applying thermal energy to ink and so on have been developed, and attempts have been made to increase printing speed and improve image resolution. Ink jet inks used in such ink jet recording methods include inks containing a water-soluble dye and inks containing a pigment. In particular, the inks that contain the pigment are excellent in water resistance and light resistance and are able to obtain image quality high in optical density, and thus, such variously developed. While the inks that contain a pigment as a color material have such advantages as mentioned above, these inks have disadvantages in that fixability of an image and scuff resistance property are poor. Development with the intention to establish compatibility between the image quality and the fixability and scuff resistance has been actively pursued.

For example, a recording liquid made of an aqueous medium containing a pigment, a polymer dispersant and a nonionic surfactant is disclosed in Japanese Patent Application Laid-Open (JP-A) No. 56-147871. Furthermore, the use of an AB or BAB block copolymer as a dispersant of the pigment is disclosed in U.S. Pat. Nos. 5,085,698 and 5,221, 334.

Furthermore, a method of increasing image fixability by adding a surfactant in ink is disclosed in JP-A No. 55-65269. Moreover, in order to improve the scuff resistance and evenness of an image, ink containing a pigment, inorganic oxide colloid and a water-soluble solvent is disclosed in JP-A No. 9-286941.

On the other hand, ultraviolet curable ink technology is an example of technology that is widely used to improve the fixability, the scuff resistance and the drying property of screen ink and gravure ink. Although the screen ink and the gravure ink are generally oil-based, application of the ultraviolet curable ink technology of those oil-based inks to water-based ink jet ink has been studied. JP-A Nos. 5-186721 and 7-224241 can be cited as examples thereof. In these patent documents, the so-called one-pack type recording method in which a recording liquid contains an ultraviolet curable resin, a photopolymerization initiator and a color material is disclosed. On the other hand, the so-called two-pack type recording method in which an ink set having ink and a processing liquid containing an ultraviolet curable resin is used is disclosed in JP-A No. 8-218018. Furthermore, a two-pack type recording method in which the ink contains either a photopolymerization initiator or an ultraviolet curable resin and the processing liquid contains the other one is disclosed in JP-A No. 2000-119574.

As is mentioned above, in general, in the one-pack type recording method, a photopolymerization initiator and a polymerizable compound that can cause a polymerization reaction due to an initiation reaction of the photopolymerization initiator are contained in the ink jet recording ink containing a color material. Then, when ultraviolet light (UV) is irradiated after an image is formed with the ink jet recording ink, the polymerizable compound polymerizes and thereby forms a recorded image with the scuff resistance (recording method A).

On the other hand, examples of the two-pack type recording include a method in which each of a photopolymerization initiator and a polymerizable compound is contained separately in an ink or a processing liquid, the two are mixed on the recording medium when an image is formed, and ultraviolet light is irradiated thereto (recording method B).

Furthermore, a liquid composition that does not contain a color material but contains a photopolymerization initiator and a polymerizable compound is provided separately from recording ink that contains a color material (recording method C).

Since the recording method A is easy to introduce into recording apparatus, it is the most general method among oil-based ink technology. However, since the color material has ultraviolet absorptivity, the curing action is disturbed. Water-based UV ink is liable to be disturbed since the polymerizable compound is diluted with water. In particular, in the case of the pigment being used as the color material, there is a result such that only a surface of a recorded image is partially cured and an interior portion thereof is not cured. Accordingly, not only can the scuff resistance not be obtained, but also a coated layer of a surface peels, resulting, on the contrary, in deteriorating the scuff resistance.

The recording method B is advantageous from a viewpoint of long-term storage, since a polymerization reaction due to spontaneous decomposition of a photopolymerization initiator can be prevented from occurring. However, since the photopolymerization initiator and the polymerizable compound are mixed on the recording medium, the mixing is not sufficient, and a large amounts thereof remain unreacted, resulting in poor film strength and insufficiency scuff resistance.

On the other hand, in the recording method C, since an ink ingredient forming a recorded image and a liquid composition containing a curing ingredient act separately, no influence on the image quality occurs, and sufficient strength in the scuff resistance of the film can be exhibited. In particular, it is characterized in that an UV filter effect due to a color material does not occur.

In the existing technology of water-based ultraviolet curable ink, there are requirements to improve scuff resistance, cracks of the film, and adhesive property onto the recording medium. The recording method C has being improved, however, a further improvement is strongly demanded. Furthermore, the recording method C is demanded to improvement discharge stability.

SUMMARY OF THE PRESENT INVENTION

The present invention has been made in view of the above circumstances.

A first aspect of the present invention is a liquid composition for ink jet comprising at least water, a photopolymerization initiator, a water-soluble organic solvent and a polymerizable compound that is capable of causing a polymerization reaction due to the photopolymerization initiator, wherein: two or more kinds of the polymerizable compound are contained; and a glass transition temperature (Tg) of at least one kind of the polymerizable compound is 50° C. or more, and a glass transition temperature (Tg) of at least one kind of the polymerizable compound is 10° C. or less.

A second aspect of the present invention is an ink set for ink jet comprising one or more kinds of ink including a pigment of at least one color and a liquid composition for ink jet including at least water, a photopolymerization initiator, a water-soluble organic solvent and a polymerizable compound that is capable of causing a polymerization reaction due to the photopolymerization initiator, wherein: two or more kinds of the polymerizable compound are contained; and a glass transition temperature (Tg) of at least one kind of the polymerizable compound is 50° C. or more, and a glass transition temperature (Tg) of at least one kind thereof is 10° C. or less.

A third aspect of the present invention is an ink jet recording apparatus comprising a recording head that discharges a liquid composition for ink jet, wherein the liquid composition for ink jet comprises at least water, a photopolymerization initiator, a water-soluble organic solvent and two or more kinds of a polymerizable compound that is capable of causing a polymerization reaction due to the photopolymerization initiator, a glass transition temperature (Tg) of at least one kind of the polymerizable compound being 50° C. or more, and a glass transition temperature (Tg) of at least one kind of the polymerizable compound being 10° C. or less.

A forth aspect of the present invention is an ink jet recording method, comprising the step of irradiating UV rays to cure the liquid composition for ink jet according to claim 1 after the liquid composition is discharged on a recorded image.

DETAILED DESCRIPTION OF THE PRESENT INVENTION

In the present invention, according to the first through fourth aspects, a liquid composition for ink jet that has sufficient scuff resistance, cause neither cracks nor peelings in the film and can be stably discharged, a ink set for ink jet, and a recording method and recording apparatus using the composition can be provided.

As other aspects of the present invention, fifth to eighteenth aspects will be described below.

A fifth aspect of the present invention is a liquid composition for ink jet according to the first aspect, wherein the polymerizable compound is at least one kind selected from the group consisting of a monomer, a macromer and an oligomer that have a polymerizing functional group.

A sixth aspect of the present invention is a liquid composition for ink jet according to the first aspect, wherein a sum total of contents of the polymerizable compound s is 0.5% by mass or more and 45% by mass or less.

A seventh aspect of the present invention is a liquid composition for ink jet according to the first aspect, wherein a mass ratio of a content of the at least one polymerizable compound whose glass transition temperature (Tg) is 50° C. or more to a content of the at least one polymerizable compound whose glass transition temperature (Tg) is 10° C. or less is in the range of 100:1 to 1:1.

A eighth aspect of the present invention is a liquid composition for ink jet according to the first aspect, including at least two kinds of the polymerizable compound having a difference in SP values of 3 or less.

A ninth aspect of the present invention is an ink jet recording apparatus according to the third aspect, wherein the ink jet recording apparatus is provided with an UV rays irradiation portion.

A tenth aspect of the present invention is an ink jet recording apparatus according to the third aspect, wherein the recording head is loaded with the liquid composition for ink jet and an ink set including a pigment ink of at least one color.

A eleventh aspect of the present invention is an ink jet recording apparatus according to the tenth aspect, wherein a mass ratio of a pigment contained in the pigment ink and the polymerizable compound contained in the liquid composition for ink jet, in discharged amounts of the pigment ink and the liquid composition for ink jet, is in a range of 1:0.5 to 1:20.

A twelfth aspect of the present invention is an ink jet recording method according to the forth aspect, comprising the steps of: supplying a recording medium; forming an image; discharging the liquid composition for ink jet; and irradiating UV rays.

A thirteenth aspect of the present invention is an ink jet recording method according to the twelfth aspect, wherein the image is formed with an ink set containing pigment ink.

A fourteenth aspect of the present invention is an ink jet recording method according to the twelfth aspect, wherein the liquid composition for ink jet is discharged after the image is formed.

A fifteenth aspect of the present invention is an ink jet recording method according to the thirteenth aspect, wherein a pigment contained in the pigment ink and the polymerizable compound contained in the liquid composition are discharged on a recording medium in a mass ratio in a range of 1:0.5 to 1:20.

The liquid composition according to the present invention contains at least water, a photopolymerization initiator, a water-soluble organic solvent, and at least two kinds of polymerizable compound s that can cause a polymerization reaction due to an initiation reaction of the photopolymerization initiator.

Here, the polymerizable compound denotes a monomer, a macromer, or an oligomer having a polymerizing functional group. The macromer denotes a monomer having a polymer structure or an oligomer structure within a molecule. In general, a polymer structure part or an oligomer structure part that the macromer contains does not have a polymerizing functional group. That which is obtained by polymerizing a monomer or a macromer at a low degree of polymerization is called an oligomer. In general, ones having a degree of polymerization of substantially 2 to 30 are indicated.

When a liquid composition having the above composition is printed in a recorded image followed by irradiating UV rays, an initiation reaction due to the polymerization initiator is generated, and subsequently, a chain reaction of the polymerizable compounds (polymerization reaction) proceeds. As a result, a resin film with sufficient scuff resistance is formed, and printed materials excellent in the scuff resistance can be obtained. Here, when the liquid composition contains at least two kinds of polymerizable compounds, discharge stability can be maintained, and a sufficient amount of the polymerizable compound can be added. In the case of one kind of polymerizable compound A being added, when an amount of dissolution of the polymerizable compound A increases the discharge stability deteriorates, at a point when the amount of dissolution exceeds a specific amount of a % by mass. In the case of two kinds of polymerizable compounds A and B being added, even when a sum total of contents of the polymerizable compound A and the polymerizable compound B exceeds the above-mentioned specific amount a % by mass, discharge stability can be maintained. This is considered to be because, due to the compatibility of two kinds of polymerizable compounds, a mutual dissolution state can be stabilized. In this case, since the affinity of each of the two kinds of the polymerizable compounds increases to make a dissolution state more stable, the effect becomes greater.

An example of an indicator that expresses the affinity is a SP value (solubility parameter). The SP value is a quantity $\delta$ defined by a formula $\delta=(\Delta H/V)^{1/2}$ in which when a molar heat of vaporization is represented by $\Delta H$ and a molar volume is represented by V. The less the difference between the SP values of the two kinds of the polymerizable compounds is, the better the compatibility becomes. In the present invention, in order to obtain a more stabilizing effect, the difference of the SP values of the polymerizable compounds is preferably 3 or less, and the difference of the SP values is more preferably 2 or less. Furthermore, the SP value of each of the polymerizable compounds is preferably 8 or more and 14 or less, and more preferably 9 or more and 11 or less.

In the present invention, the SP value is a value obtained by calculation. The SP value can be calculated according to a structure of a compound. The calculation formula is $\delta=(\Sigma \Delta e/\Sigma \Delta V)^{1/2}$. The $\Delta e$ here is energy of vaporization of an atom or atomic group, and the $\Delta V$ is the molar volume of an atom or atomic group. The atom or atomic group indicates a so-called functional group, and more specifically, a halogen atom, a carboxyl group, or C=C bond (Yuji Harasaki, *Basic Chemistry of Coating*, Maki Shoten, p. 54)

Due to such action, when two kinds of polymerizable compounds are mixed and added, an influence on the discharge stability is reduced. Accordingly, since a larger amount of polymerizable compounds can be added, sufficient scuff resistance effect can be obtained at a smaller amount of discharge.

Furthermore, two kinds of polymerizable compounds can exist with stability in an aqueous solution due to the compatibility. However, when the liquid composition adheres to the recording medium and a water content permeates therein, the compatibility is lost, and the polymerizable compounds become very viscous and remain on a recorded image on a surface of a recording medium. As a result, stronger scuff resistance effect can be obtained, in comparison with the case where a single polymerizable compound is used.

Furthermore, since two kinds of polymerizable compound s exist in proximity to each other due to the affinity thereof, the probability of molecules of the polymerizable compound s meeting each other during the polymerization reaction increases to form a film having a higher polymerization degree, and thus the scuffing resistance can be improved. On the other hand, in the case of the polymerization reaction being caused with one kind of polymerizable compound, it is necessary to increase the probability of molecules meeting each other by increasing a concentration of the polymerizable compound to gain a high degree of polymerization. Accordingly, the discharge stability and the storage stability are adversely affected.

Moreover, among the at least two kinds of polymerizable compounds contained in the liquid composition according to the present invention, the glass transition point (Tg) of at least one kind of polymerizable compound is 50° C. or more, and the glass transition point (Tg) of at least one kind of polymerizable compound is 10° C. or less.

The Tg of a polymerizable compound is, in the case of the polymerizable compound in the liquid composition being a macromer, the Tg of the macromer itself. Furthermore, in the case of the polymerizable compound in the liquid composition being not a macromer but a monomer, the Tg of the polymerizable compound is the Tg when the polymerizable compound s are polymerized. In the case of the polymerizable compound in the liquid composition being an oligomer, the Tg of the polymerizable compound is the Tg when the polymerizable compound (oligomer) becomes a polymer.

In a case where only polymerizable compounds whose Tg is 10° C. or less are contained, even after the polymerization reaction, sufficient scuff resistance cannot be obtained. A film is seemingly formed and is in a sufficiently dried state, but because it is a soft polymer, it easily peels off. Furthermore, in a case where the recording medium is stored in a pile or is put in a pocket file for documents, trouble such as transcription occurs.

On the other hand, in a case where only the polymerizable compounds whose Tg is 50° C. or more are contained, sufficient scuff resistance can be gained and the drying properties also are excellent. However, since the internal stress due to the polymerization reaction is large, in some cases, the film may suffer some cracks and trouble such as peeling of the film may be caused by the cracks. The occurrence of the cracks and the peeling are not caused just after the formation of the film by exposure to UV rays, and are caused over time by the evaporation of moisture and the organic solvent components in the film and the recording medium.

In order to prevent such trouble from occurring, the polymerizable compound that has the Tg of 50° C. or more and the polymerizable compound that has the Tg of 10° C. or less are mixed and contained in the liquid composition. As a result, a film that has sufficient scuff resistance and does not peel can be formed. Among a polymerizable compounds whose Tg are 10° C. or less, ones having a Tg of 0° C. or less are preferable, and ones having a Tg in the range of −50° C. or more and −10° C. or less are more preferable. Furthermore, among the polymerizable compounds whose Tg are 50° C. or more, ones having a Tg of 55° C. or more are preferable, and ones having a Tg in the range of 60° C. or more and 120° C. or less are more preferable.

Furthermore, a total content of the polymerizable compounds contained in the liquid composition according to the present invention is preferably 0.5% by mass or more and 45% by mass or less. Thus, in comparison with the conventional case where a single kind of polymerizable compound is added, in the present invention, the polymerizable compound can be added in a greater amount. While a total amount of the polymerizable compounds supplied to the recording medium can be controlled with the recording apparatus, a content of the polymerizable compounds strongly affects dischargeability, drying properties and curability. When the amount added is less than 0.5% by mass, a curing reaction is disturbed by other components and a film is scarcely formed. Furthermore, in a case where the amount added is more than 45% by mass, the viscosity increases greatly and the discharge thereof by an ink jet recording apparatus becomes difficult. The amount added is preferably 3% by mass or more and 35% by mass or less, and more preferably, 5% by mass or more and 25% by mass or less.

Furthermore, when the thermal ink jet method is used, trouble such as kogation occur and thus the upper limit of the amount to be added is even more restricted. A more preferable amount to be added for the thermal ink jet method is 3% by mass or more and 30% by mass or less, and an even more preferable amount to be added is 5% by mass or more and 20% by mass or less.

Moreover, a content ratio of the polymerizable compound whose glass transition point (Tg) is 50° C. or more contained in the liquid composition of the present invention and the polymerizable compound whose glass transition point (Tg) is 10° C. or less contained therein is preferably in a range of 100:1 to 1:1 by mass ratio. In a case where the polymerizable compound whose Tg is 10° C. or less is contained in a greater amount, trouble such as transcription during storage in a pile and transcription to a storage item such as a pocket file is likely to occur. Accordingly, the polymerizable compound whose Tg is 10° C. or less is preferably contained in a smaller amount than the polymerizable compound whose Tg is 50° C. or more. On the other hand, in a case where a content of the polymerizable compound whose Tg is 50° C. or more is more than 100 times a content of the polymerizable compound whose Tg is 10° C. or less, the polymerizable compound whose Tg is 10° C. or less scarcely has an effect, and cracks and peeling are caused. The content ratio, in terms of mass ratio of the polymerizable compound whose Tg is 50° C. or more to the polymerizable compound whose Tg is 10° C. or less is more preferably in a range of 20:1 to 3:1.

Furthermore, the polymerizable compound whose glass transition position (Tg) is 10° C. or less contained in the liquid composition according to the present invention is preferably selected from those mentioned below; polypropylene glycol monoacrylic acid ester, polypropylene glycol monomethacrylic acid ester, (polyethylene glycol-polypropylene glycol) monoacrylic acid ester, (polyethylene glycol-polypropylene glycol) monomethacrylic acid ester, (polyethylene glycol-polytetramethylene glycol) monoacrylic acid ester, (polyethylene glycol-polytetramethylene glycol) monomethacrylic acid ester, (polypropylene glycol-polytetramethylene glycol) monoacrylic acid ester, (polypropylene glycol-polytetramethylene glycol) monomethacrylic acid ester, methyl acrylate, ethyl acrylate, n-butyl acrylate and oligomers containing these as a constitutional unit.

the polymerizable compound whose glass transition position (Tg) is 10° C. or less is more preferably polypropylene glycol monoacrylic acid ester, polypropylene glycol monomethacrylic acid ester, (polyethylene glycol-polypropylene glycol) monoacrylic acid ester, (polyethylene glycol-polypropylene glycol) monomethacrylic acid ester, (polyethylene glycol-polytetramethylene glycol) monoacrylic acid ester, (polyethylene glycol-polytetramethylene glycol) monomethacrylic acid ester, (polypropylene glycol-polytetrametylene glycol) monoacrylic acid ester, (polypropylene glycol-polytetramethylene glycol) monomethacrylic acid ester, and further more preferably polypropylene glycol monoacrylic acid ester and polypropylene glycol monomethacrylic acid ester.

These macromers represented by polypropylene glycol mono(meth)acrylic acid esters are assumed that the esters act as a graft chain in the graft polymerization in the polymerization due to UV rays irradiation . Accordingly, when a polymer component in the macromer is longer, an effect thereof is sufficiently exhibited, and cracks and peeling after the polymerization reaction do not occur. In the case where the polymer component in the macromer is straight polypropylene glycol, polyethylene glycol-tetramethylene glycol, or polypropylene grycol-tetramethylene glycol, repetition number of units of ethylene glycol, propylene glycol, and tetramethylene glycol is preferably substantially 4 to 15.

A molecular weight of the polymerizable compound whose Tg is 10° C. or less is preferably 100 or more and 1800 or less, and more preferably 150 or more and 1000 or less.

The polymerizable compound whose glass transition point (Tg) is 50° C. or more contained in the liquid composition according to the present invention is preferably polyethylene glycol monoacrylic acid ester derivatives, polyethylene glycol monomethacrylic acid ester derivatives, methyl methacrylate, ethyl methacrylate, isopropyl methacrylate and oligomers containing these as the constitutional units, and more preferably, polyethylene glycol monoacrylic acid ester derivatives and polyethylene glycol monomethacrylic acid ester derivatives. These compounds are added equal to 100 times an amount of the component whose Tg is 10° C. or less, and become a main chain component in the polymerization reaction due to UV rays irradiation . Furthermore, since these compounds are contained in the liquid composition in a large quantity, it is preferable that they do not adversely affect on the dischargeability. Accordingly, the polymer component of macromer has preferably a lower polymerization degree, and the polymerization degree is preferably 2 or more and 10 or less. Moreover, also in a case where the polymerizable compound whose glass transition point (Tg) is 50° C. or more is in the form of oligomer, the polymerization degree is desirably 2 or more and 15 or less.

A molecular weight of the polymerizable compound whose Tg is 50° C. or more is preferably 70 or more and 700 or less, and more preferably 100 or more and 500 or less.

Although the difference between the Tgs of two kinds of polymerizable compounds is not particularly restricted, the difference of the Tgs is preferably 60° C. or more and 200° C. or less, and more preferably 80° C. or more and 150° C. or less.

The ink jet recording method according to the present invention includes a step of irradiating UV rays to cure the liquid composition after the liquid composition is coated on a formed recorded image. Moreover, The ink jet recording method preferably includes a step of supplying a recording medium and a step of forming an image. Furthermore, ink for ink jet used in the step of forming an image on the recording medium preferably contains at least one color of pigment ink. The color materials used in the ink for ink jet are mainly dyes and pigments. Since dyes easily permeate fiber of the recording medium and absorbing material, the scuff resistance is excellent. On the other hand, since the pigment has a very large dispersion particle diameter in comparison with that of the dye, and the permeation thereof into the fiber and absorbing material is restricted. As a result, the pigment has poor scuff resistance. However, the pigment is excellent in so-called weatherproofing property such as light resistance, water resistance and gas resistance, and also in image density. In the present invention, even in the case where a pigment of poor fixability is used, it is possible to increase the fixability by forming a film on a surface of the recording medium. In other words, a recorded image is excellent in each property of image density, weatherproofing property and fixability by combining the pigment and the liquid composition. Even when a dye is used as a color material, the liquid composition according to the present invention can be used. In the case of the dye, since fixability is already excellent, there is no particular effect in improvimg in fixability. However, due to the surface coating effect, weatherproofing property is improved. It is generally said that the main reason for deterioration of light resistance and gas resistance is due to oxidation of the dye by light and oxidizing gases. Accordingly, the oxidation does not proceed by covering a surface of the dye with a film, and the storage properties of the image is improved. Furthermore, since smudging due to water and flowing out of the dye do not arise due to the coating, excellent waterproofing performance is exhibited. Furthermore, due to the formation of the film, the surface of the recording medium becomes a uniform surface, irregular reflection caused by the recording medium and the pigment particles can be suppressed, glossiness is improved, and an effect of improving the optical density can thereby be obtained.

In the ink jet recording method and the ink jet recording apparatus according to the present invention, the pigment contained in the ink and the polymerizable compound contained in the liquid composition are preferably discharged on the recording medium with a mass ratio thereof in the range of 1:0.5 to 1:20, more preferably in the range of 1:1 to 1:15, and still more preferably in the range of 1:3 to 1:10. When, in a mass ratio of a content of the pigment contained in the ink to a content of the polymerizable compound contained in the liquid composition, the polymerizable compound becomes less than 1:0.5, a film cannot be formed, and therefore the scuff resistance cannot be sufficiently demonstrated. On the other hand, in a case where the content of the polymerizable compound becomes larger than 1:20, a theoretical coating amount of the liquid composition becomes very large, and it takes a lot of time for a volatile component to vaporize. Thus, not only are drying properties deteriorated, but the film generated by the polymerization also contains a volatile component and becomes soft, whereby sufficient scuff resistance cannot be obtained. Under the most preferable conditions, although depending on the content of the polymerizable compounds contained in the liquid composition, physical properties thereof and the pigment ink used for the image formation, an amount of the polymerizable compound on an image is preferably substantially 10% by mass or more and 200% by mass or less, and more preferably 30% by mass or more and 100% by mass or less, relative to an amount of the pigment.

A photopolymerization initiator is contained in the liquid composition according to the present invention. The photopolymerization initiator preferably has an absorption wavelength in an ultraviolet area in the neighborhood of 250 nm to 450 nm, and causes an initiation reaction that generates a radical and an ion. Examples of general initiators are included Irgacure 170, 184, 651, 907, 1700, 1800, 1850 and 2959 (manufactured by Chiba Specialty Chemical Co.), Vicure 10 and 30 (manufactured by Stauffer Cemical Company), and Lucirin TPO (manufactured by BASF Corp.).

A water-soluble organic solvent is contained in the liquid composition according to the present invention. Specific examples thereof include polyhydric alcohols such as ethylene glycol, diethylene glycol, propylene glycol, butylene glycol, triethylene glycol, 1, 5-pentanediol, 1, 2, 6-hexanetriol and glycerin; amines typical in triethanolamine; polyhydric alcohol derivatives such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monohexyl ether, triethylene glycol monobutyl ether, propylene glycol monobutyl ether and dipropylene glycol monobutyl ether; nitrogen-containing solvents such as pyrrolidone, N-methyl-2-pyrrolicone and cyclohexyl pyrrolidone; alcohols such as ethanol, isopropyl alcohol, butyl alcohol and benzyl alcohol; or sulfur-containing solvents such as thiodiethanol, thiodiglycerol, sulforan and dimethylsulfoxide; and propylene carbonate and ethylene carbonate. These water-soluble organic solvents can be used singly or in combinations of two or more kinds. More preferable examples include diethylene glycol, triethanolamine, diethylene glycol monobutyl ether, isopropyl alcohol and glycerin.

A content of the water-soluble organic solvent in the liquid composition according to the present invention is not particularly restricted. However, the content of the water-soluble organic solvent is preferably in the range of 1% by mass or more and 60% by mass or less, and more preferably 5% by mass or more and 40% by mass or less, relative to a total mass of the liquid composition.

In order to control the surface tension and wettability of the liquid composition, or in order to improve the reliability of discharge from an ink jet nozzle by solubilizing an organic impurity, a cationic surfactant, a nonionic surfactant, or an anionic surfactant may be added in the liquid composition according to the present invention. These surfactants can be used singly or in combinations of a plurality of kinds. A content of the surfactant is preferably 5% by mass or less, and more preferably in the range of 0.01% by mass or more to 3% by mass or less, relative to a total mass of the liquid composition.

An ink set according to the present invention include one or more kinds of inks containing a color material of at least one color and the liquid composition for ink jet.

As the ink for ink jet, the pigment ink, dye ink, black ink and color ink can be used without restriction. Specific examples include dyes such as C.I. direct black-2, -4, -9, -11, -17, -19, -22, -32, -80, -151, -154, -168, -171, -194 and -195; C.I. direct blue-1, -2, -6, -8, -22, -34, -70, -71, -76, -78, -86, -112, -142, -165, -199, -200, -201, -202, -203, -207, -218, -236, -287, and -307; C.I. direct red-1, -2, -4, -8, -9, -11, -13, -15, -20, -228, -31, -33, -37, -39, -51, -59, -62, -63, -73, -75, -80, -81, -83, -87, -90, -94, -95, -99, -101, -110, -189, -227; C.I. direct violet-2, -5, -9, -12, -18, -25, -37, -43, -66, -72, -76, -84, -92 and -107; C.I. direct yellow-1, -2, -4, -8, -11, -12, -26, -27, -28, -33, -34, -41, -44, -48, -58, -86, -87, -88, -132, -135, -142, -144, and -173; C.I. food black-1 and -2; C.I. acid black-1, -2, -7, -16, -24, -26, -28, -31, -48, -52, -63, -107, -112, -118, -119, -121, -156, -172, -194, and -208; C.I. acid blue-1, -7, -9, -15, -22, -23, -27, -29, -40, -43, -55, -59, -62, -78, -80, -81, -83, -90, -102, -104, -111, -185, -249, and -254; C.I. acid red-1, -4, -8, -13, -14, -15, -18, -21, -26, -35, -37, -52, -110, -144, -180, -249, and -257; and C.I. acid yellow-1, -3, -4, -7, -11, -12, -13, -14, -18, -19, -23, -25, -34, -38, -41, -42, -44, -53, -55, -61, -71, -76, -78, -79 and -122.

These dyes can be used singly or in combinations of a plurality of kinds. A content of these dyes in the ink in the present invention is preferably in the range of 0.1% by mass or more and 10% by mass or less, and more preferably 1% by mass or more and 8% by mass or less, relative to a total mass of the ink. A kind of pigment is not restricted. Either of organic pigments and inorganic pigments can be used as pigments. Specifically, for black color, carbon black pigments such as furnace black, lampblack, acetylene black and channel black can be cited; for instance, Raven 7000, Raven 5750, Raven 5250, Raven 5000 ULTRAII, Raven 3500, Raven 2000, Raven 1500, Raven 1250, Raven 1200, Raven 1190 ULTRAII, Raven 1170, Raven 1255, Raven 1080 and Raven 1060 (all of those mentioned above are manufactured by Colombian Carbon Co.); Regal 400R, Regal 330R, Regal 660R, Mogul L, Black Pealrs L, Monarch 700, Monarch 800, Monarch 1000, Monarch 1100, Monarch 880, Monarch 900, Monarch 1300 and Monarch 1400 (all of those mentioned are manufactured by Cabot Co.); Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (all of those mentioned above are manufactured by Degussa Co.); and No. 25, No. 33, No. 40, No. 47, No. 52, No. 900, NO. 2300, MCF-88, MA600, MA7, MA8 and MA100 (all of those mentioned above are manufactured by Mitsubishi Chemical Co.) can be used.

For cyan color, C.I. Pigment Blue-1, C.I. Pigment Blue-2, C.I. Pigment Blue-3, C.I. Pigment Blue-15, C.I. Pigment Blue-15: 1, C.I. Pigment Blue-15:3, C.I. Pigment Blue-15:4, C.I. Pigment Blue-16, C.I. Pigment Blue-22, and C.I. Pigment Blue-60 can be used, although cyan color pigment is not restricted to the above examples.

For magenta color, C.I. Pigment Red-5, C.I. Pigment Red-7, C.I. Pigment Red-12, C.I. Pigment Red-48, C.I. Pigment Red-48:1, C.I. Pigment Red-57, C.I. Pigment Red-112, C.I. Pigment 122, C.I. Pigment Red-123, C.I. Pigment Red-146, C.I. Pigment Red-168, C.I. Pigment Red-184, and C.I. Pigment Red-202 can be used, although magenta color pigment is not restricted to the above examples.

For yellow color, C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-138, C.I. Pigment Yellow-151, and C.I. Pigment Yellow-154 can be used, although yellow color pigment is not restricted to the above examples.

These pigments can be used singly or in combinations of a plurality of kinds. A content of the pigment used in the ink according to the present invention is preferably in the range of 0.5% by mass or more and 20% by mass or less, and more preferably in the range of 2% by mass or more and 10% by mass or less, relative to a total mass of the ink. Furthermore, a so-called encapsulated pigment obtained by covering pigment particles with a polymer also can be used.

A water-soluble solvent and a surfactant can be used, if necessary, in ink for ink jet of the ink set of the present invention. Every surfactant that can be contained in the liquid composition can be used.

The ink jet recording method according to the present invention includes adhering the above explained liquid composition and the ink to a recording medium and forming a recording image. In more detail, droplets of the ink are discharged from an orifice in accordance with a recording signal, and an image is thereby formed on the medium. Examples of recording systems used for the ink jet recording method and recording apparatus include a so-called charge control system wherein ink is discharged by making use of an electrostatic attractive force, a so-called piezo system wherein ink is discharged by making use of a vibration pressure of a piezo element, and a so-called thermal ink jet system wherein ink is heated to form and grow bubbles and thereby generate pressure, and droplets are formed by making use of the pressure. Among these systems, the thermal ink jet system and the piezo system are preferable in that full color images can be provided in small sizes and at low cost.

In the present invention, after an image is formed with ink according to the recording system, the liquid composition is discharged followed by irradiation of UV rays. A time period from the formation of the image with the ink to the discharge of the liquid composition is not particularly limited. It is preferably 0.5 sec or more and 120 sec or less, and more preferably 2 sec or more and 20 sec or less.

The liquid composition is preferably discharged so as to cover the image formed with the ink. The liquid composition may be discharged either only on the image or on a full page of recording paper. At the very least, the liquid composition is discharged so that the liquid composition comes into contact with part of the ink image.

The UV rays can be irradiated anytime after the discharge of the liquid composition. It is preferably 240 sec or less after the discharge of the liquid composition, and more preferably at a time of 5 sec or more and 120 sec or less.

A UV rays irradiation unit according to the present invention will be explained. The UV rays irradiation unit has a UV rays irradiation lamp. Preferable examples of the UV rays irradiation lamp include a low-pressure mercury lamp wherein a vapor pressure of mercury is in the range of 1 Pa or more and 10 Pa or less during lighting-up, a high-pressure mercury lamp, and a mercury lamp with a fluorescent material coated thereon. An emission spectrum of these mercury lamps in the UV region is in the range of 184 nm or more and 450 nm or less. Examples of the mercury lamps include a metal halide lamp, a high-pressure mercury lamp, a very high-pressure mercury lamp, a xenon flush lamp, a deep UV lamp, a lamp wherein a mercury lamp is energized without an electrode by use of a microwave from the outside, and a UV laser.

An integrated intensity of necessary UV rays, as a total energy in the UV region, is preferably substantially in the range of 500 mJ/cm$^2$ or more and 5,000 mJ/cm$^2$ or less from the viewpoint of the rate of polymerization. When the integrated intensity is not sufficient, the adhesiveness of the ink fixed to the recording paper cannot be sufficiently exhibited.

An intensity of UV rays irradiation is preferably in the range of 40 W/m$^2$ or more and 600 W/m$^2$ or less, and more preferably, in the range of 80 W/m$^2$ or more and 320 W/m$^2$ or less.

The ink jet recording apparatus according to the present invention has a recording head, and the ink and the liquid composition are discharged from the recording head. The recording apparatus that can be used favorably will be explained below. However, the invention is not restricted thereto.

The recording apparatus mainly has an outer cover; a tray where a predetermined amount of the recording medium such as plain paper can be placed; transfer rollers (carrying means) which carry each sheet of the recording medium inside of the recording apparatus; and an image formation portion (image formation means) at which the ink and the liquid composition are discharged on a surface of the recording medium to form an image.

The transfer rollers are a pair of rollers set rotatably inside of the recording apparatus. They not only hold tight the recording medium set on the tray, but also carry a specified amount of the recording medium one by one at a specified timing into the recording apparatus.

The image formation portion forms an image on a surface of the recording medium with ink. The image formation portion mainly has a recording head, ink tanks, a power supply signal cable, a carriage, a guide rod, a timing belt, a driving pulley and a maintenance unit.

The ink tank set has ink tanks wherein inks of different colors from each other and the liquid composition are dischargeably stored.

Furthermore, the power supply signal cable and the ink tanks are connected to the recording head. When external image recording information is input to the recording through the power supply signal cable head, the recording head sucks in a predetermined amount of ink from each of the ink tanks in accordance with the image recording information and discharges ink on a surface of the recording medium. Incidentally, the power supply signal cable has a role of supplying to the recording head electric power necessary for driving the recording head along with the image recording information.

Furthermore, the recording head is disposed and held on the carriage, and the carriage is connected to the timing belt connected to the guide rod and the driving pulley. Due to this configuration, the recording head can also move along the guide rod in a direction (primary scanning direction) parallel to a surface of the recording medium and perpendicular to a carrying direction (secondary scanning direction) of the recording medium.

The recording apparatus has control means that controls, according to the image recording information, a driving timing of the recording head and a driving timing of the carriage. As a result, it becomes possible to form images successively based on the image recording information in a predetermined region on a surface of the recording medium that is carried along the carrying direction at a predetermined speed.

The UV rays irradiation portion can be disposed inside of the recording apparatus or outside thereof separately from the recording apparatus. As for the UV rays irradiation portion, a method of irradiating by scanning a UV rays irradiation lamp and a method of irradiating by using a fixed UV rays irradiation lamp can be applied. When the former method is used, it is also possible to mount the UV lamp on the carriage of the head that discharges the liquid composition, to irradiate the UV rays just after printing. In particular, in the case of an ink jet printer that is high in number of divisions, since the lamp is scanned repeatedly on the same area, a less powerful lamp can be used, and thus miniaturization and power saving of the lamp is possible. Furthermore, even in the case of a printer that is low in number of divisions, when high intensity UV rays obtained by focusing light outputted from a UV generator is provided to the carriage through an optical cable, energy sufficient for the photopolymerization can be supplied. On the other hand, since high-intensity UV can be irradiated on the recording medium which is carried after printing with the liquid composition is finished, the latter method is suitable for an ink jet printer whose aim is to print at a high speed with high throughput. A bar type UV rays irradiation lamp such as a fluorescent lamp is generally used.

Since the UV rays irradiation lamp is apt to generate heat and likely to deform the recorded materials, it is preferable that the recording apparatus has cooling apparatus. As the cooling apparatus, a cold mirror, a cold filter, a work cooling apparatus or the like can be utilized.

EXAMPLES

In what follows, the present invention will be more detailed with examples; however, the present invention is not restricted thereto at all.

Example 1

Components below are mixed and stirred, and thereby liquid composition 1 is prepared.

| | |
|---|---|
| Polyethylene glycol monomethacrylate (a number of repeating units of ethylene glycol part (hereinafter referred to as [n] in the example) = 4 to 5, Tg = 64° C.; manufactured by Nippon Oil & Fats Co., Ltd.) | 15% by mass |
| Polypropylene glycol monomethacrylate (a number of repaeting units of propylene glycol part (hereinafter referred to as [m] in the example) = 9, Tg = −46° C.; manufactured by Nippon Oil & Fats Co., Ltd.) | 1% by mass |
| Diethylene glycol (manufactured by Wako Pure Chemical Industries, Ltd.) | 20% by mass |
| Olfine E1010 (manufactured by Nissin Chemical Industry Co., Ltd.) | 1% by mass |
| Irugacure 2959 (manufactured by Ciba Specialty Chemicals) | 1% by mass |
| Water | balance |

Example 2

Components below are mixed and stirred, and thereby liquid composition 2 is prepared.

| | |
|---|---|
| Polyethylene glycol monomethacrylate (n = 8, Tg = 58° C.; manufactured by Nippon Oil & Fats Co., Ltd.) | 15% by mass |
| Methoxy polyethylene glycol monomethacrylate (n = 4, Tg = 6° C.; manufactured by Nippon Oil & Fats Co., Ltd.) | 1% by mass |
| Triethanolamine (manufactured by Wako Pure Chemical Industries, Ltd.) | 15% by mass |
| Olfine E1010 (manufactured by Nissin Chemical Industry Co., Ltd.) | 1% by mass |
| Irugacure 2959 (manufactured by Ciba Specialty Chemicals) | 1% by mass |
| Water | balance |

Example 3

Components below are mixed and stirred, and thereby liquid composition 3 is prepared.

| | |
|---|---|
| (Polyethylene glycol-polypropylene glycol) monomethacrylate (n = 5, m = 2, Tg = 62° C.; manufactured by Nippon Oil & Fats Co., Ltd.) | 15% by mass |
| Polypropylene glycol monomethacrylate (m = 9, Tg = −46° C.; manufactured by Nippon Oil & Fats Co., Ltd.) | 1% by mass |
| Triethanolamine (manufactured by Wako Pure Chemical Industries, Ltd.) | 20% by mass |
| Diethylene glycol monobutyl ether (manufactured by Wako Pure Chemical Industries, Ltd.) | 5% by mass |

| | |
|---|---|
| Irugacure 2959 (manufactured by Ciba Specialty Chemicals) | 1% by mass |
| Water | balance |

Example 4

Components below are mixed and stirred, and thereby liquid composition 4 is prepared.

| | |
|---|---|
| Polyethylene glycol monomethacrylate (n = 4 to 5, Tg = 64° C.; manufactured by Nippon Oil & Fats Co., Ltd.) | 30% by mass |
| Polypropylene glycol monomethacrylate (m = 9, Tg = −46° C.; manufactured by Nippon Oil & Fats Co., Ltd.) | 20% by mass |
| Diethylene glycol (manufactured by Wako Pure Chemical Industries, Ltd.) | 10% by mass |
| Olfine E1010 (manufactured by Nissin Chemical Industry Co., Ltd.) | 1% by mass |
| Irugacure 2959 (manufactured by Ciba Specialty Chemicals) | 3% by mass |
| Water | balance |

Example 5

Components below are mixed and stirred, and thereby liquid composition 5 is prepared.

| | |
|---|---|
| Polyethylene glycol monomethacrylate (n = 4 to 5, Tg = 64° C.; manufactured by Nippon Oil & Fats Co., Ltd.) | 1% by mass |
| Polypropylene glycol monomethacrylate (m = 9, Tg = −46° C.; manufactured by Nippon Oil & Fats Co., Ltd.) | 15% by mass |
| Triethanol amine (manufactured by Wako Pure Chemical Industries, Ltd.) | 20% by mass |
| Olfine E1010 (manufactured by Nissin Chemical Industry Co., Ltd.) | 1% by mass |
| Irugacure 2959 (manufactured by Ciba Specialty Chemicals) | 1% by mass |
| Water | balance |

Example 6

Components below are mixed and stirred, and thereby liquid composition 7 is prepared.

| | |
|---|---|
| Polyethylene glycol monomethacrylate (n = 4 to 5, Tg = 64° C.; manufactured by Nippon Oil & Fats Co., Ltd.) | 2% by mass |
| Polypropylene glycol monomethacrylate (m = 9, Tg = −46° C.; manufactured by Nippon Oil & Fats Co., Ltd.) | 1% by mass |
| Diethylene glycol (manufactured by Wako Pure Chemical Industries, Ltd.) | 10% by mass |
| Olfine E1010 (manufactured by Nissin Chemical Industry Co., Ltd.) | 1% by mass |
| Irugacure 2959 (manufactured by Ciba Specialty Chemicals) | 3% by mass |
| Water | balance |

Comparative Example 1

Components below are mixed and stirred, and thereby liquid composition 8 is prepared.

| | |
|---|---|
| Polyethylene glycol monomethacrylate (n = 4 to 5, Tg = 64° C.; manufactured by Nippon Oil & Fats Co., Ltd.) | 35% by mass |
| Diethylene glycol (manufactured by Wako Pure Chemical Industries, Ltd.) | 20% by mass |
| Olfine E1010 (manufactured by Nissin Chemical Industry Co., Ltd.) | 1% by mass |
| Irugacure 2959 (manufactured by Ciba Specialty Chemicals) | 1% by mass |
| Water | balance |

Comparative Example 2

Components below are mixed and stirred, and thereby liquid composition 9 is prepared.

| | |
|---|---|
| Polypropylene glycol monomethacrylate (m = 9, Tg = −46° C.; manufactured by Nippon Oil & Fats Co., Ltd.) | 35% by mass |
| Triethanol amine (manufactured by Wako Pure Chemical Industries, Ltd.) | 10% by mass |
| Olfine E1010 (manufactured by Nissin Chemical Industry Co., Ltd.) | 1% by mass |
| Irugacure 2959 (manufactured by Ciba Specialty Chemicals) | 1% by mass |
| Water | balance |

Comparative Example 3

Components below are mixed and stirred, and thereby liquid composition 10 is prepared.

| | |
|---|---|
| Polyethylene glycol monomethacrylate (n = 4 to 5, Tg = 64° C.; manufactured by Nippon Oil & Fats Co., Ltd.) | 35% by mass |
| Diethylene glycol (manufactured by Wako Pure Chemical Industries, Ltd.) | 20% by mass |
| Olfine E1010 (manufactured by Nissin Chemical Industry Co., Ltd.) | 1% by mass |
| Water | balance |

Pigment Ink

Components below are mixed and stirred followed by filtering with a membrane filter having a pore size of 5 μm, and thereby ink is prepared.

| (Self-dispersible pigment dispersion liquid) | |
|---|---|
| CAB-O-JET 300 (manufactured by Cabot Corporation) | 3% by mass |
| Diethylene glycol | 10% by mass |
| Butyl carbitol | 10% by mass |
| Olfine E1010 (manufactured by Nissin Chemical Industry Co., Ltd.) | 1% by mass |
| Deionized water | balance |

Calculation of the SP Value

The SP values of the polymerizable compounds used in the examples are calculated according to a calculation formula;

$$\delta = (\Sigma \Delta e / \Sigma \Delta V)^{1/2}.$$

Manufacture of Evaluation Samples

A solid black patch of 100% coverage with the above pigment ink is output by use of a thermal ink jet recording apparatus Work Centre B900 (manufactured by Fuji Xerox Co., Ltd.). As the recording medium, ink jet photographic paper "Gasai-Photo quality" (manufactured by Fuji Photo Film Co., Ltd.) is used.

On the solid patch, the liquid compositions formulated according to examples and the comparative examples are output by use of the same recording apparatus. After that, they are exposed to UV rays (290 to 310 nm in wavelength) for one minute with UV rays illumination apparatus SUNTEST CPS+ (manufactured by Atlas Material Testing Technology LLC) to cause the polymerization reaction. In irradiation intensity is 560 W/m².

Surface Observation

Evaluation samples are visually observed of a formation state of film.
○: A surface of the patch is covered with a film, and there is no crack and peeling.
×: The cracks and peeling are generated. Alternately, a film is not formed.

Scuff Resistance Test

Evaluation samples each are rubbed with a printed face of coated paper GCAA0002 (manufactured by Fuji Xerox Office Supply Co., Ltd.), and an offset state of the color material is observed. Δ and ○ show those that are in practically acceptable range.
○: There is no offset on the coated paper.
Δ: The coated paper is stained slightly.
×: The offset on the coated paper occurs and unevenness in density appears in the patch.

Transcription Test

A plurality of A4 sheets of evaluation sample is piled up and stored for one week under a weight of 1 kg at room temperature. After that, whether a film of the evaluation sample is transcribed on a backside of the sample piled up or not is observed. Δ and ○ show those in the practically acceptable range.
○: There is found no transcription.
Δ: Though the samples adhere each other due to the film, there is generated no transcription.
×: Transcription is observed. Alternately, a film partially peels.

Discharge Test

In order to check whether the liquid composition is coated or not, a slight amount of a color material (Cyan dye DB199) is added to the liquid composition followed by outputting by use of a thermal ink jet recording apparatus Work Centre B900 (manufactured by Fuji Xerox Co., Ltd.). Outputted samples are visually observed. Δ and ○ show those in the practically acceptable range.
○: The liquid composition is discharged without problems.
Δ: Slight failure in directionality is generated.
×: Void image and discharge failure are observed.

Drying Property

The drying condition of the film after the UV rays irradiation test is confirmed. A printed face of the coated paper (GCAA0002 manufactured by Fuji Xerox Office Supply Co., Ltd.) is brought into contact with a sample face and, under a pressure of 100 g/cm², the wettability of the coated paper is observed. Δ and ○ show those in the practically acceptable range.
○: The film is sufficiently dry and the coated paper is not wet.
Δ: Though the film is resilient, the coated paper is not wet.
×: The film is sticky and the coated paper becomes wet.

The results of the evaluations are summarized in Table 1.

TABLE 1

| | Surface observation | Scuff resistance test | Transcription test | Discharge test | Drying properties | Tg | SP value of polymerizable compound 1 | SP value of polymerizable compound 2 | Difference of SP values |
|---|---|---|---|---|---|---|---|---|---|
| Example 1 | ○ | ○ | ○ | ○ | ○ | 64° C./−46° C. | 11.0 | 9.8 | 1.2 |
| Example 2 | ○ | ○ | ○ | ○ | ○ | 58° C./6° C. | 10.4 | 9.2 | 1.2 |
| Example 3 | ○ | ○ | ○ | ○ | ○ | 62° C./−46° C. | 10.3 | 9.8 | 0.5 |
| Example 4 | ○ | ○ | ○ | Δ | ○ | 64° C./−46° C. | 11.0 | 9.8 | 1.2 |
| Example 5 | ○ | ○ | Δ | ○ | ○ | 64° C./−46° C. | 11.0 | 9.8 | 1.2 |
| Example 6 | ○ | Δ | ○ | ○ | Δ | 64° C./−46° C. | 11.0 | 9.8 | 1.2 |
| Comparative Example 1 | X | Δ | Δ | X | ○ | 64° C. | 11.0 | — | — |
| Comparative Example 2 | ○ | X | X | Δ | ○ | −46° C. | — | 9.8 | — |
| Comparative Example 3 | X | X | X | Δ | X | 64° C. | 11.0 | — | — |

As is shown by the results in Table 1, in the examples 1 through 7 wherein the recording method and the recording apparatus according to the present invention are used and the liquid composition containing two or more kinds of polymerizable compounds at least one of which has the glass transition temperature (Tg) of 50° C. or more and at least one of which has the glass transition temperature (Tg) of 10° C. or less is used, the liquid composition for ink jet excellent in the scuff resistance, transcription properties, the dischargeability and the drying property can be obtained.

Accordingly, when the liquid composition according to the present invention and the recording method as well as the recording apparatus therewith are used, the recorded image excellent in the scuff resistance and the dischargeability can be obtained and stable discharge of the liquid composition is realized.

What is claimed is:

1. A liquid composition for ink jet comprising at least water, a photopolymerization initiator, a water-soluble organic solvent and a polymerizable compound that is capable of causing a polymerization reaction due to the photopolymerization initiator, wherein:
   two or more kinds of the polymerizable compound are contained;
   a glass transition temperature (Tg) of at least one kind of the polymerizable compound is 50° C. or more, and a glass transition temperature (Tg) of at least one kind of the polymerizable compound is 10° C. or less; and
   the polymerizable compound is at least one kind selected from the group consisting of a monomer, a macromer and an oligomer having a polymerizing functional group.

2. A liquid composition for ink jet according to claim 1, wherein a sum total of contents of the polymerizable compound is 0.5% by mass or more and 45% by mass or less.

3. A liquid composition for ink jet according to claim 1, wherein a mass ratio of a content of the at least one kind of polymerizable compound having a glass transition temperature (Tg) of 50° C. or more to a content of the at least one kind of polymerizable compound having a glass transition temperature (Tg) of 10° C. or less is in the range of 100:1 to 1:1.

4. A liquid composition for ink jet according to claim 1, including at least two kinds of the polymerizable compound having a difference in SP value of 3 or less.

5. An ink set for ink jet comprising one or more kinds of ink including a pigment of at least one color and a liquid composition for ink jet including at least water, a photopolymerization initiator, a water-soluble organic solvent and a polymerizable compound that is capable of causing a polymerization reaction due to the photopolymerization initiator, wherein:
   two or more kinds of the polymerizable compound are contained; and
   a glass transition temperature (Tg) of at least one kind of the polymerizable compound is 50° C. or more, and a glass transition temperature (Tg) of at least one kind of the polymerizable compound is 10° C. or less.

6. An ink jet recording apparatus comprising a recording head that discharges a liquid composition for ink jet, wherein the liquid composition for ink jet comprises at least water, a photopolymerization initiator, a water-soluble organic solvent and two or more kinds of a polymerizable compound that is capable of causing a polymerization reaction due to the photopolymerization initiator;
   wherein a glass transition temperature (Tg) of at least one kind of the polymerizable compound is 50° C. or more, and a glass transition temperature (Tg) of at least one kind of the polymerizable compound is 10° C. or less.

7. An ink jet recording apparatus according to claim 6, wherein the ink jet recording apparatus is provided with a UV rays irradiation portion.

8. An ink jet recording apparatus according to claim 6, wherein the recording head is loaded with the liquid composition for ink jet and an ink set including a pigment ink of at least one color.

9. An ink jet recording apparatus according to claim 8, wherein a mass ratio of a pigment contained in the pigment ink and the polymerizable compound contained in the liquid composition for ink jet, in discharged amounts of the pigment ink and the liquid composition for ink jet, is in a range of 1:0.5 to 1:20.

10. An ink jet recording method, comprising the step of:
    irradiating UV rays to cure the liquid composition for ink jet according to claim 1 after the liquid composition is discharged on a recorded image.

11. An ink jet recording method according to claim 10, comprising the steps of:
    supplying a recording medium;
    forming an image;
    discharging the liquid composition for ink jet; and
    irradiating UV rays.

12. An ink jet recording method according to claim 11, wherein the image is formed with an ink set containing pigment ink.

13. An ink jet recording method according to claim 11, wherein the liquid composition for ink jet is discharged after the image is formed.

14. An ink jet recording method according to claim 12, wherein a pigment contained in the pigment ink and the polymerizable compound contained in the liquid composition are discharged on a recording medium in a mass ratio in a range of 1:0.5 to 1:20.

* * * * *